United States Patent Office — 3,111,342, Patented Nov. 19, 1963

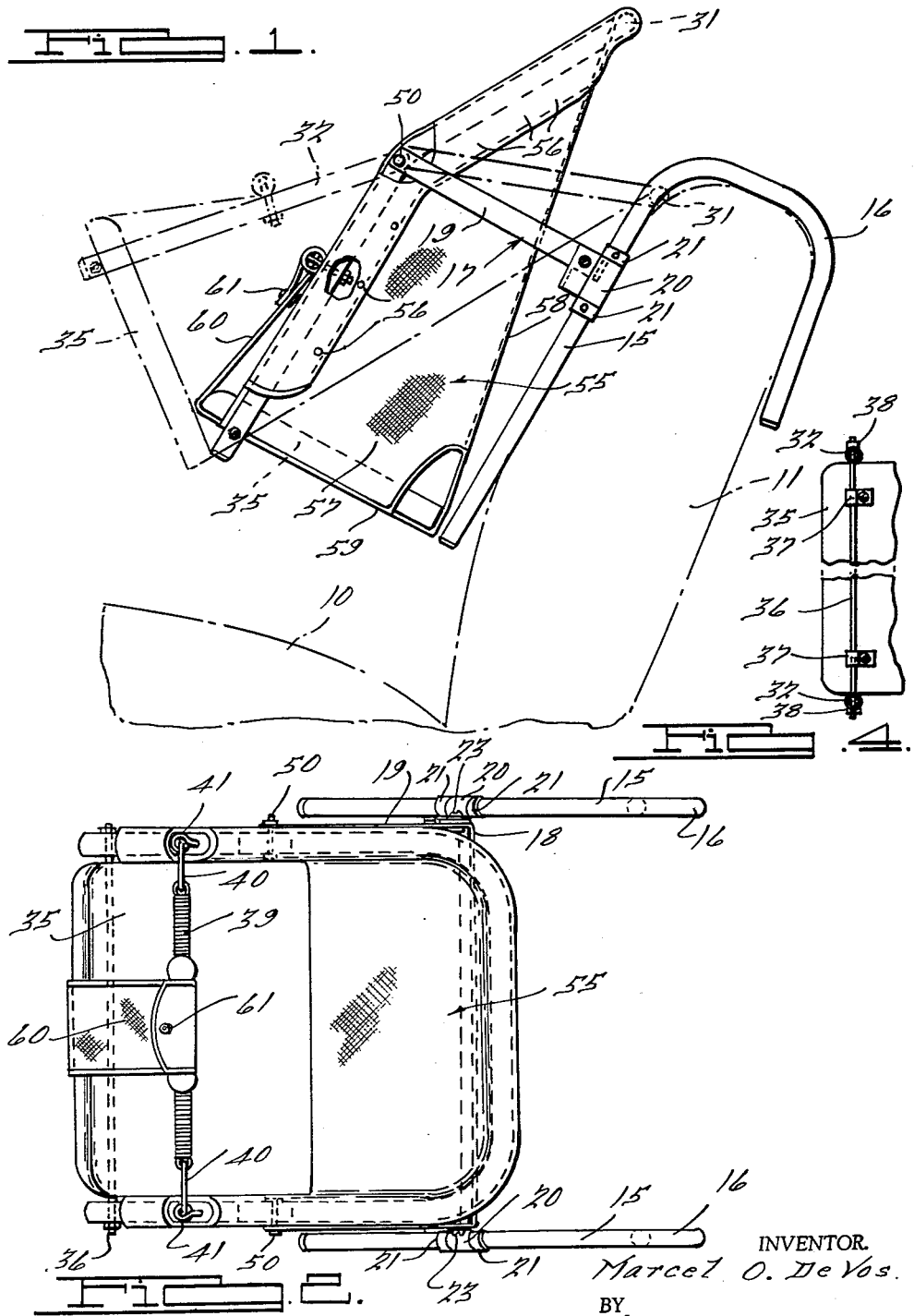

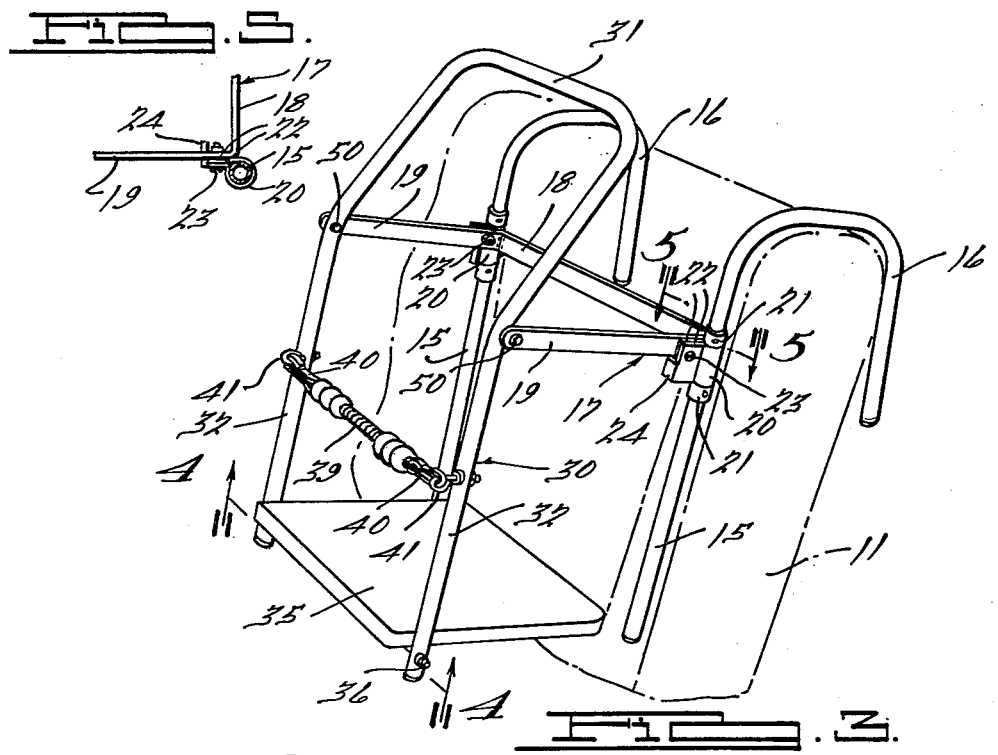

3,111,342
CHILD'S CAR SEAT
Marcel O. De Vos, Grosse Pointe Woods, Mich., assignor, by mesne assignments, to Grow-Rite Corporation, a corporation of New York
Filed Dec. 27, 1961, Ser. No. 162,350
6 Claims. (Cl. 297—216)

This invention relates to a child's car seat adapted to be supported by the back of a conventional automobile seat and more particularly to a device of this character in which the seat tilts upwardly and backwardly automatically to prevent the occupant from flying forward when the vehicle is stopped suddenly or is negotiating a sharp curve.

One of the objects of this invention is to provide a child's car seat of this type in which the seat assembly is pivotally mounted or suspended on its supporting structure at a point above its center of gravity whereby when the vehicle is slowed down or stopped suddenly, the inertia of the seat assembly and the occupant acts to rock the upper part of the seat backwardly and the lower part forwardly and upwardly thereby overcoming the tendency of the occupant to fly or fall forward. This novel construction also substantially eliminates the possibility of injury to the child by reason of violent contact with the safety belt and renders the seat safe in practically any emergency.

Another object of the invention is to provide a device of this character which may be quickly and easily folded into a flat, compact condition so that it may be readily carried or stored.

Another object of the invention is to provide a device of this type having adjustable seat brackets adapted to fit the seats of all makes of cars.

Other objects of the invention are to simplify the construction whereby the device may be economically manufactured from a minimum number of parts of simple design and which may be assembled with facility.

Various other objects and advantages, and the novel details of construction of two commercially practical embodiments of the invention will become more apparent as this description proceeds, especially when considered in connection with the accompanying drawings in which:

FIGURE 1 is a side elevational view of a child's car seat constructed in accordance with this invention, mounted on the back of a conventional automobile seat, the device being shown in full lines in normal position, and in dot and dash lines in its tilted position, FIGURE 2 is a top plan view of the device in the full line position shown in FIGURE 1, FIGURE 3 is a view similar to FIGURE 1 with the cover removed, FIGURE 4 is a detail fragmentary bottom elevational view looking in the direction of the arrows on line 4—4 of FIGURE 3, FIGURE 5 is a detail sectional elevational view taken substantially on the plane indicated by line 5—5 in FIGURE 3, FIGURE 6 is a view similar to FIGURE 1 showing a slightly modified form of construction, and FIGURE 7 is a fragmentary detail bottom elevational view of the seat of the modified construction shown in FIGURE 6.

Referring now to the drawings, and more particularly to FIGURES 1 through 5, inclusive, it will be noted that there is illustrated a conventional automobile seat 10 having a back 11 upon which the child's car seat comprising this invention is adapted to be supported. Obviously, however, the device may be supported upon the upright backs of other types of seats or in other types of environments.

The improved seat construction of this invention comprises a pair of hook-shaped hanger members or brackets 15 which may be conveniently formed of tubular stock bent to form hook-shaped end portions 16 adapted to readily engage the upright back of a conventional automobile seat or any other similar upright member.

The reference character 17 indicates a pivoted bracket member which is substantially U-shaped and may be conveniently formed of strip metal. The U-shape of the bracket member 17 provides a base portion 18 and a pair of legs or arms 19. The purpose of the pivoted bracket 17 is to pivotally support or suspend the seat assembly yet to be described.

The bracket member 17 is pivotally connected to the hanger members 15 for movement from a position substantially parallel with or contiguous to the hanger members 15 to a position substantially perpendicular thereto. Each pivotal connection comprises a sleeve member 20 surrounding a vertical leg of the hanger member, the sleeve being prevented from endwise movement by means of collars 21 secured to the hanger member. This permits the hanger member to rotate for a reason yet to be referred to.

Each sleeve member 20 is provided with a pair of ears or flanges 22 extending perpendicularly thereto and a pivot pin 23, preferably in the form of a bolt, is passed through these flanges 22 and the bracket member 17. This pivotal connection is made with the arms 19 adjacent the base portion 18. One of the flanges 22 is provided with an angularly-extending lug 24 constituting a stop adapted to be engaged by the leg 19 of the bracket member 17 to arrest the pivotal movement of the bracket member in a position substantially perpendicular to the hanger members 15.

The seat assembly comprises a substantially U-shaped frame member 30, which, in the preferred embodiment of the invention, is formed of tubular stock. The U-shape of the seat frame provides a base portion or a cross bar 31 and spaced, parallel legs 32.

The reference character 35 indicates a seat which, although not so illustrated, may be foam padded for comfort. The seat is pivotally supported at its forward edge adjacent the ends of the legs 32 of the seat frame member (see FIGURE 4) by means of a rod 36 secured to the bottom of the seat by means of clips 37. The ends of the rod 36 pass through the legs 32 and the rod is secured to the legs 32 by nuts or the like 38 threaded onto the ends of the rod 36.

Extending between the legs 32 of the seat frame 30 is a safety belt or restraining member 39 provided at its ends with releasable spring fasteners 40 of any suitable type adapted to engage eyes 41 carried by the legs 32.

One of the principal features of this invention is to provide a child's seat of the type thus far described in which the seat tilts upwardly and backwardly when the car is slowed down or stopped suddenly so as to overcome the tendency of the occupant to fly or fall forwardly. This is accomplished by pivotally connecting the seat frame 30 to the pivoted bracket member 17 at a point above its center of gravity so that the inertia of the seat assembly and the occupant act to rock the upper part of the seat backwardly and the lower part forwardly and upwardly. To accomplish this, the seat frame is pivotally connected as at 50 to the forward ends of the legs 19 of the pivoted bracket 17. The pivots 50 may be in the form of bolts or the like passing through the ends of the bracket legs 19 and the adjacent portions of the seat frame member 30.

As shown in FIGURES 1 and 2, the seat is provided with a preferably removable, flexible cover 55 which encloses the seat frame member 30 and may be detachably connected thereto by means of snap fasteners or the like 56, or may be stitched thereto, if desired. The seat cover provides sides 57 and a back 58 for the seat assembly and extends under the seat 35 as indicated at 59, and thus acts to hold the seat in its operative position. The front of the seat cover 55 is provided with a tab-like extension 60 which extends upwardly over the front edge of the seat 35 and around the safety belt 39 and is adapted to be detachably connected thereto by means of a snap fastener or the like 61. The tab-like extension 60 cooperates with the safety belt to restrain forward movement of the occupant of the seat.

In the modification illustrated in FIGURES 6 and 7, the tubular seat frame 30 is eliminated and, instead, the seat frame member is formed of two members bent from metal rods. The upper frame 70 is preferably made from a single length of metal rod bent into a substantially U-shape, the ends of the U being bent to form eyes 71 to receive the fasteners 40 of the safety belt 39. The other portion 72 of the seat frame member is also preferably formed of a single length of metal rod bent into a substantially U-shape. The ends of the member 72 are bent laterally to provide pivotal connections 73 with the bracket member 17. The base of the U-shaped member 72 (see FIGURE 7) extends under the seat 35 and is pivotally connected thereto by clips 73'. The base of the U may be provided with a loop portion 74 extending perpendicularly therefrom to form a support for the seat 35. The two members 70 and 72 constituting the seat frame member are integrated by welding as at 75. This construction may, if desired, be employed for economy reasons, or because of the facility with which it may be manufactured and assembled. Otherwise, the construction is the same as illustrated in the preceding figures.

In both forms of construction, the hanger members 15 are freely rotatable in the sleeves 20 so that the hook-shaped ends 16 may be displaced toward or away from one another to adjust the hanger members or brackets to fit the seats of all makes of cars.

The tilting action of the seat is illustrated by dot and dash lines in FIGURE 1 and from this it will be noted that when the vehicle is slowed down, as, for instance, when negotiating a curve, or is stopped suddenly, the inertia of the seat assembly and the occupant act to rock the upper part of the seat backwardly and the lower part of the seat forwardly and upwardly, thereby overcoming the tendency of the occupant to be displaced from the seat. The base 31 of the U-shaped frame member 30 will, in the extreme tilted position of the seat, engage the automobile seat back to limit the pivotal movement of the seat.

The portion 31 or the corresponding portion of the seat frame member 70—72 also constitute a handle portion by which the collapsed seat may be carried. It will be understood that the seat may be collapsed by swinging the seat portion 35 about its pivot to a position substantially parallel with the legs 32 of the seat frame member and by swinging the pivoted bracket 17 about its pivots 23 which moves the seat frame member in a position substantially parallel with or contiguous to the hanger members 15. The hanger members 15 may be rotated in the sleeves 20 to swing the hooked ends 16 into parallel relation with the collapsed seat structure.

While two practical and commercially acceptable forms of the invention have been described and illustrated herein in detail, it will be understood that various changes may be made as may come within the purview of the accompanying claims.

What is claimed is:

1. A child's seat adapted for attachment to the back of a conventional automobile seat comprising, a pair of hook-shaped hanger members adapted to engage the back of the automobile seat, a substantially U-shaped bracket member connected adjacent its base to said hanger members with the legs thereof projecting substantially perpendicular to said hanger member, a seat assembly comprising an inverted U-shaped frame providing a cross bar and spaced parallel legs, a seat carried by the lower ends of said legs, and means pivotally mounting said seat assembly on said bracket member adjacent the ends of the legs thereof above the center of gravity of said seat assembly, whereby when the automobile is slowed down or stopped, the inertia of the seat assembly will cause the upper part of the seat assembly to rock backwardly, the backward movement thereof being limited by the engagement of said cross bar with the automobile seat.

2. A device as described in claim 1 in which the bracket member is pivotally connected to said hanger members, and the pivotal connection comprises sleeves in which said hanger members are rotatable, lugs on said sleeves pivotally connected to the legs of the U-shaped bracket member adjacent the base thereof, and shoulders on said lugs engageable by the legs of the U-shaped bracket member when the latter is in its substantially perpendicular position.

3. A child's seat adapted for ready attachment to the back of a conventional automobile seat comprising, a pair of hanger members having hook-shaped ends adapted to engage the upper edge of the automobile seat, a substantially U-shaped bracket member, means pivotally connecting said bracket member adjacent the base thereof to said hanger members for movement to a position substantially perpendicular thereto, said pivotal connection comprising sleeves in which said hanger members are freely rotatable, a seat assembly comprising a substantially inverted U-shaped frame, a seat pivotally supported adjacent its front edge between the ends of the legs of the frame member, the base of said U-shaped frame constituting a carrying handle for the device, and a flexible cover extending over said frame member and under said seat to hold said seat in operative position; and means for pivotally suspending said seat assembly on the ends of said U-shaped bracket member, said pivotal connection being above the center of gravity of said seat assembly, whereby when the forward movement of the automobile is interrupted, the inertia of the seat assembly and its occupant will cause the upper part of the assembly to rock backwardly and the lower part to rock forwardly, thereby overcoming the tendency of the occupant to be displaced forwardly.

4. A child's seat adapted for attachment to the back of a conventional automobile seat comprising, a pair of hook-shaped hanger members adapted to engage the back of the automobile seat, a substantially U-shaped bracket member connected adjacent its base to said hanger members with the legs thereof projecting substantially perpendicular to said hanger members, a seat assembly comprising a frame, a seat carried by the lower end of said frame, and means pivotally mounting said seat assembly on said bracket member adjacent the ends of the legs thereof above the center of gravity of said seat assembly, whereby when the automobile is slowed down or stopped, the inertia of the seat assembly will cause the upper part of the seat assembly to rock backwardly, said seat frame comprising a pair of upper and lower substantially U-shaped members bent from metal rods, said U-shaped members having the legs thereof overlapped and rigidly secured together, the ends of the legs of one of said U-shaped members being bent laterally to form pivots for pivotally connecting said seat frame to the bracket.

5. A device as claimed in claim 4 in which the lower of said U-shaped members is provided with a loop portion extending substantially perpendicularly thereto to form a support for the seat.

6. A device as described in claim 4 in which the ends of the upper of said U-shaped members are bent to form eyes to receive the fasteners of a safety belt.

(References on following page)

References Cited in the file of this patent

UNITED STATES PATENTS

| | | |
|---|---|---|
| 1,436,275 | Maclardy | Nov. 21, 1922 |
| 2,291,640 | Lee | Aug. 4, 1942 |
| 2,402,974 | Morse | July 2, 1946 |
| 2,533,527 | Soltis | Dec. 12, 1950 |
| 2,664,140 | Kindelberger | Dec. 29, 1953 |
| 2,690,787 | Soltis | Oct. 5, 1954 |
| 2,730,163 | Goldberg | Jan. 10, 1956 |
| 2,848,040 | Chernivsky | Aug. 19, 1958 |
| 2,902,084 | Stevens | Sept. 1, 1959 |

FOREIGN PATENTS

| | | |
|---|---|---|
| 244,903 | Great Britain | Dec. 31, 1925 |